United States Patent [19]

Sartorio et al.

[11] Patent Number: 5,035,566
[45] Date of Patent: Jul. 30, 1991

[54] AUTOMATIC CHANGE OF FINGERS OF THE SINGLE ARM BENDING ROBOT

[75] Inventors: Franco Sartorio; Stefano Vergano, both of Turin, Italy

[73] Assignee: Amada Company, Limited, Japan

[21] Appl. No.: 284,387

[22] Filed: Dec. 14, 1988

[30] Foreign Application Priority Data

Dec. 15, 1987 [IT] Italy ............... 68075 A87

[51] Int. Cl.⁵ .......................... B25J 15/04
[52] U.S. Cl. .................... 414/729; 901/39; 901/41; 294/86.4; 294/119.1; 72/422
[58] Field of Search ............ 414/729; 901/39, 41; 29/568; 294/119.1, 86.4; 72/422

[56] References Cited

U.S. PATENT DOCUMENTS

| 3,823,466 | 7/1974 | Jerue | 29/568 |
| 4,591,198 | 5/1986 | Monforte | 294/119.1 X |
| 4,698,898 | 10/1987 | Horsch | 29/568 |
| 4,784,421 | 11/1988 | Alvite | 294/86.4 |
| 4,795,124 | 1/1989 | Nagai | 72/422 X |

FOREIGN PATENT DOCUMENTS

| 904504 | 3/1986 | Belgium . |
| 118052 | 2/1984 | European Pat. Off. . |
| 110655 | 6/1984 | European Pat. Off. . |
| 155362 | 11/1984 | European Pat. Off. . |
| 3407445 | 2/1984 | Fed. Rep. of Germany . |
| 2584634 | 7/1986 | France . |
| 2130550 | 11/1983 | United Kingdom . |
| 2191466 | 6/1986 | United Kingdom . |

Primary Examiner—Robert J. Spar
Assistant Examiner—Donald W. Underwood
Attorney, Agent, or Firm—Wigman & Cohen

[57] ABSTRACT

A manipulator is provided for a plate bending machine containing an arm which extends in the vertical direction and a pair of bracket members in which one bracket member can freely approach and withdraw from the other, wherein the bracket members are provided with engaging members which can engage with and be released from an engaging section formed on the jaws for grasping a plate material. A jaw exchanging device which contains in turn a plurality of jaw release structures which can mount and remove the jaws of the manipulator and can retain the jaw before mounting and after removal thereof, and a transfer structure which can transfer the plurality of jaw release structures together between the manipulator and a jaw storage magazine, and selectively transfer any one of the jaw release structures to a jaw changing position on the manipulator in a position on the side of the manipulator are also provided.

10 Claims, 4 Drawing Sheets

AUTOMATIC CHANGE OF FINGERS OF THE SINGLE ARM BENDING ROBOT

BACKGROUND OF THE INVENTION

1. Field of the Invention

The present invention relates to a manipulator which is capable of handling a plate material which is subjected to a bending process in a bending machine such as a press break and the like, and a robotic device equipped with this manipulator, and, in particular, to a manipulator for a plate processing machine wherein a jaw can be exchanged according to the shape of plate being handled, and a robotic device equipped with this manipulator.

2. Description of the Prior Art

Conventionally, a manipulator has been developed for automatically handling the workpiece in a plate bending machine such as a press break, where a plate bending operation is performed.

A conventional manipulator is usually set up in a prescribed position in front of the bending process machine. In this type of manipulator the arm is provided on a supporting column in a manner to allow both free vertical and rotary movement, and also to provide free expansion, contraction, and rotation. A plate clamping device is provided on the end of the arm for freely grasping a workpiece.

In a conventional manipulator with the abovementioned configuration, for the plate clamping device to have a wide range of movement, the arm must be long, and the overall configuration results in a large manipulator, which is a drawback. In addition, the positioning of a plate in the plate bending device of the plate bending process machine is performed entirely by the manipulator. It is therefore necessary to construct a high-precision manipulator to improve the precision of the positioning of the plate. This leads to the problem of excessively high production costs.

In order to eliminate these problem, the inventor of the present invention has developed a highly servicable manipulator for handling plate material in a plate bending machine similar to a press break, which is described in Japanese Patent Application SHO-62-313760.

However, even in this manipulator, when performing a process such as bending and the like, when the area of the point where the plate can be clamped is small the jaw of the plate clamping device must be changed in a manual operation conforming to the state of the clamping, which is a drawback. In addition, it is difficult to automate this operation, which makes it inconvenient.

SUMMARY OF THE INVENTION

An object of the present invention is to provide, with due consideration to the drawbacks of such conventional devices, a manipulator for a plate bending machine on which the jaw can be changed automatically, and a robotic device equipped with such a manipulator.

This object is achieved in the present invention by the provision of a manipulator for a plate bending machine comprising an arm which extends in the vertical direction and a pair of bracket members in which one bracket member can freely approach and withdraw from the other, wherein the bracket members are provided with engaging members which can engage with and be released from an engaging section formed on the jaws for grasping a plate material.

In addition, a robotic device for a plate bending machine in the present invention, comprises a manipulator for a plate bending machine provided with a freely mountable and detachable jaw; and a jaw exchanging device which comprises in turn a plurality of jaw release means which can mount and remove the jaw of the manipulator and can retain the jaw before mounting and after removal thereof, and a transfer means which can transfer the plurality of jaw release means together between the manipulator and a jaw storage magazine, and selectively transfer any one of the jaw release means to a jaw changing position on the manipulator in a position on the side of the manipulator.

In the manipulator for a plate bending machine of the present invention, as a result of this configuration, the jaw provided with the engaging member can be easily removed from the bracket member by releasing the engagement of the engaging member of the bracket member. Accordingly, the jaw can easily be changed automatically.

In the robotic device for a plate bending machine of the present invention, as a result of this configuration, a jaw removed from a jaw storage magazine, is retained in one jaw release means out of the plurality of jaw release means. Then, the jaw release means which are not retaining a jaw and the jaw release means which are retaining a jaw are moved together to the manipulator. On the side of the manipulator, first, the empty jaw releasing means is moved to the jaw changing position on the manipulator, and the jaw which is mounted on the manipulator is removed therefrom by the empty jaw releasing means. Next, the jaw releasing means which is retaining the jaw is moved to the jaw changing position, and the said retained jaw can be mounted on the manipulator. Then, the exchange of jaws is completed by transferring the jaw which has been removed to the jaw storage magazine.

Specifically, the new and old jaws can be exchanged simply by one transfer between the magazine and the manipulator.

These and other objects, features and advantages of the present invention will be more apparent from the following description of a preferred embodiment taken in conjunction with the accompanying drawings.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Figure 1:
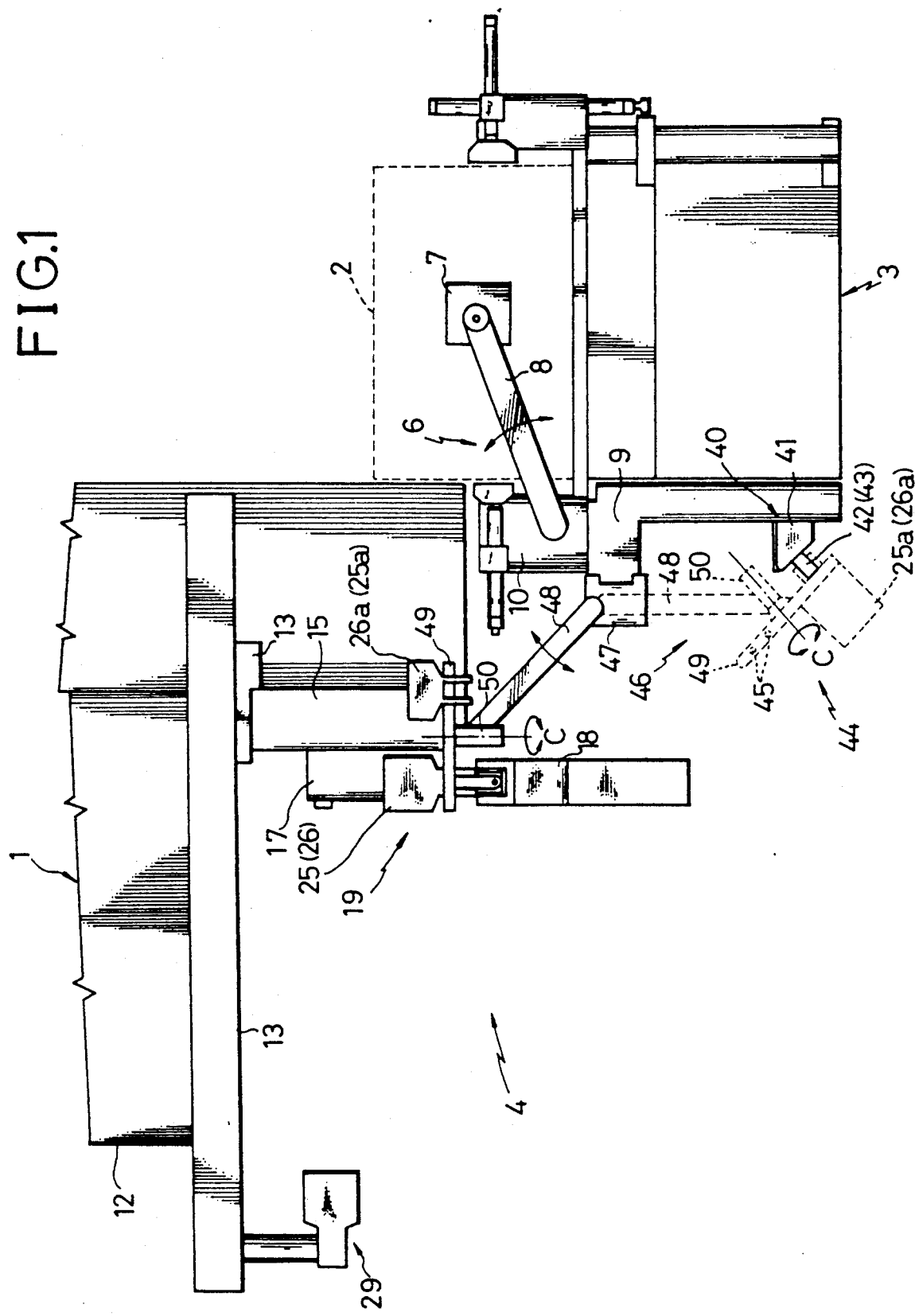
FIG. 1 is a schematic plan view of one embodiment of the robotic device for a plate bending machine of the present invention.
Figure 2:
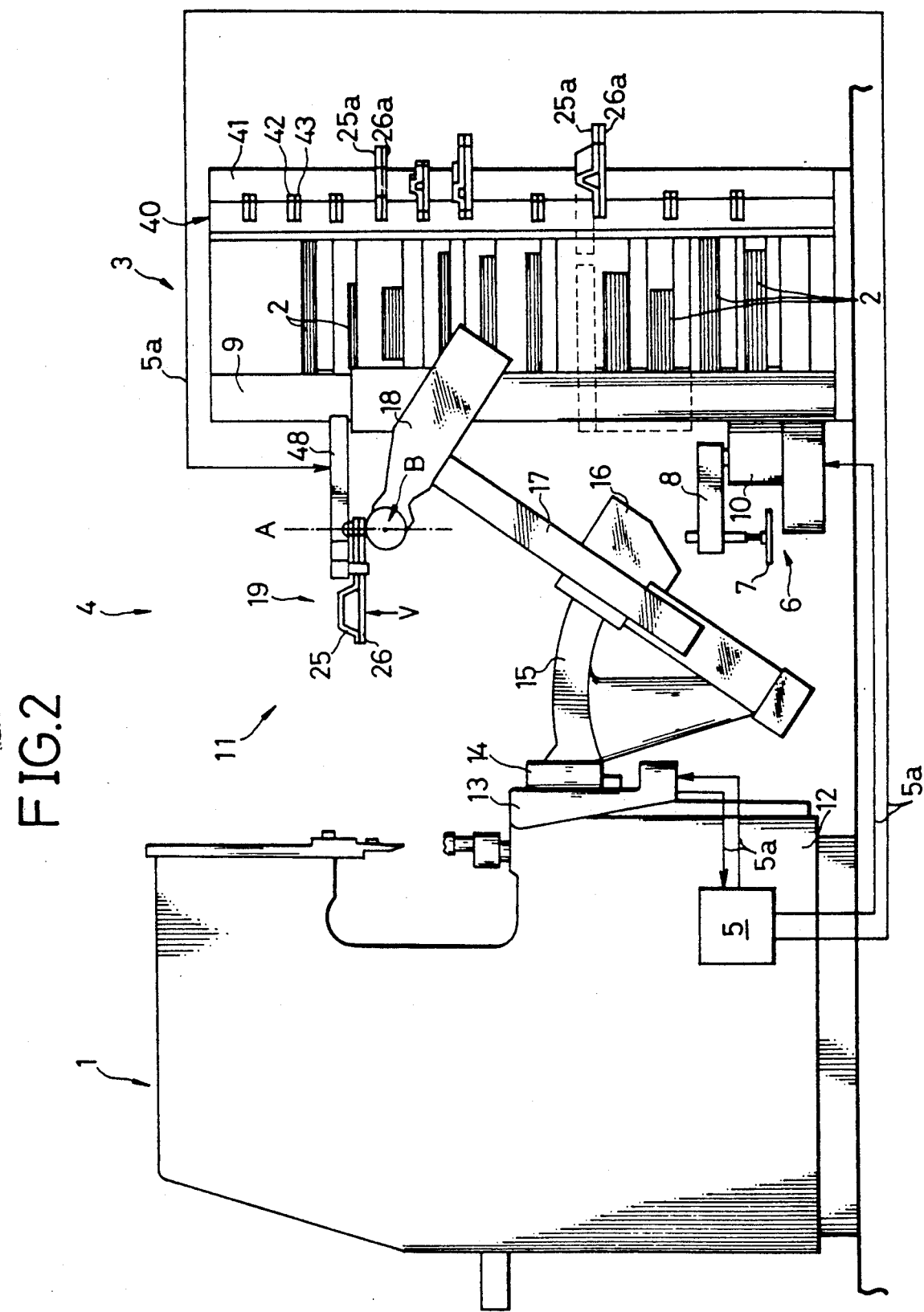
FIG. 2 is a schematic side view of the same embodiment.

Now referring to FIG. 1 and FIG. 2, a plate bending machine 1, for example, a press break or the like, is provided on the left hand side with a plate material magazine 3 which stores a plate 2.

In order to perform the plate bending operation in cooperation with the plate bending machine 1, a robotic device 4 for a plate bending machine is provided. In this embodiment of the present invention, the robotic device 4 for a plate bending machine includes a plurality of devices to perform the plate bending operation in cooperation with the plate bending machine 1 under control of a control device 5 such as a microprocessor.

Specifically, the robotic device 4 is provided with a plate feeding device 6 which feeds the plate 2 to the plate bending machine 1. The plate feeding device 6 comprises a magnetic or vacuum type suction board 7 to which the plate 2 is caused to adhere, a freely rotatable arm 8 which supports the suction board 7 and rotates in the direction of the arrows in FIG. 1, and an elevating section 10 which supports the arm 8 and is freely elevated along a supporting column 9 provided on the plate storage magazine 3. A control wire 5a from the control device 5 is connected to an actuator (omitted from the drawings) for driving the arm 8 and the elevating section 10.

Accordingly, the plate 2 adhering to the suction board 7 on the plate feeding device 6, under the control of the control device 5, is moved vertically laterally and longitudinally by means of the elevating section 10 and the arm 8, and as a result, the plates 1 stored in the plate storage magazine 3 are fed, one at a time, to the plate bending machine 1.

The robotic device 4 for a plate bending machine is also provided with a manipulator 11 for maintaining the plate 2 fed to the plate bending machine 1 during the course of the plate bending process. The manipulator 11 is installed on a base plate 13 which is integrally mounted on a lower frame 12 of the plate bending machine 1. More specifically, a first transfer block 14 which is freely movable along the base plate 13 is provided on the front face of the base plate 13.

A fan-shaped section 15, of which the upper part is enlarged in the longitudinal direction, is provided on the first transfer block 14. A second transfer block 16 which is freely movable along the fan-shaped section 15 is supported on the fan-shaped section 15. An elevating brace 17 which is freely movable along the direction perpendicular to the direction of movement of the second transfer 16 is supported on the second transfer block 16.

An arm 18 extended in a direction which is close to the longitudinal direction is suitably secured to the upper section of the elevating brace 17. A plate clamping device 19 which clamps the side edge section of the plate 2 is mounted on the end of the arm 18. More specifically, the plate clamping device 19 is provided in a freely rotating manner in the vertical direction centered around an axis B which extends in the lateral direction with respect to the plate bending machine 1. The plate clamping device 19 is also provided in a freely rotating manner centered around an axis A which is at right angles to the axis B.

Figure 3:
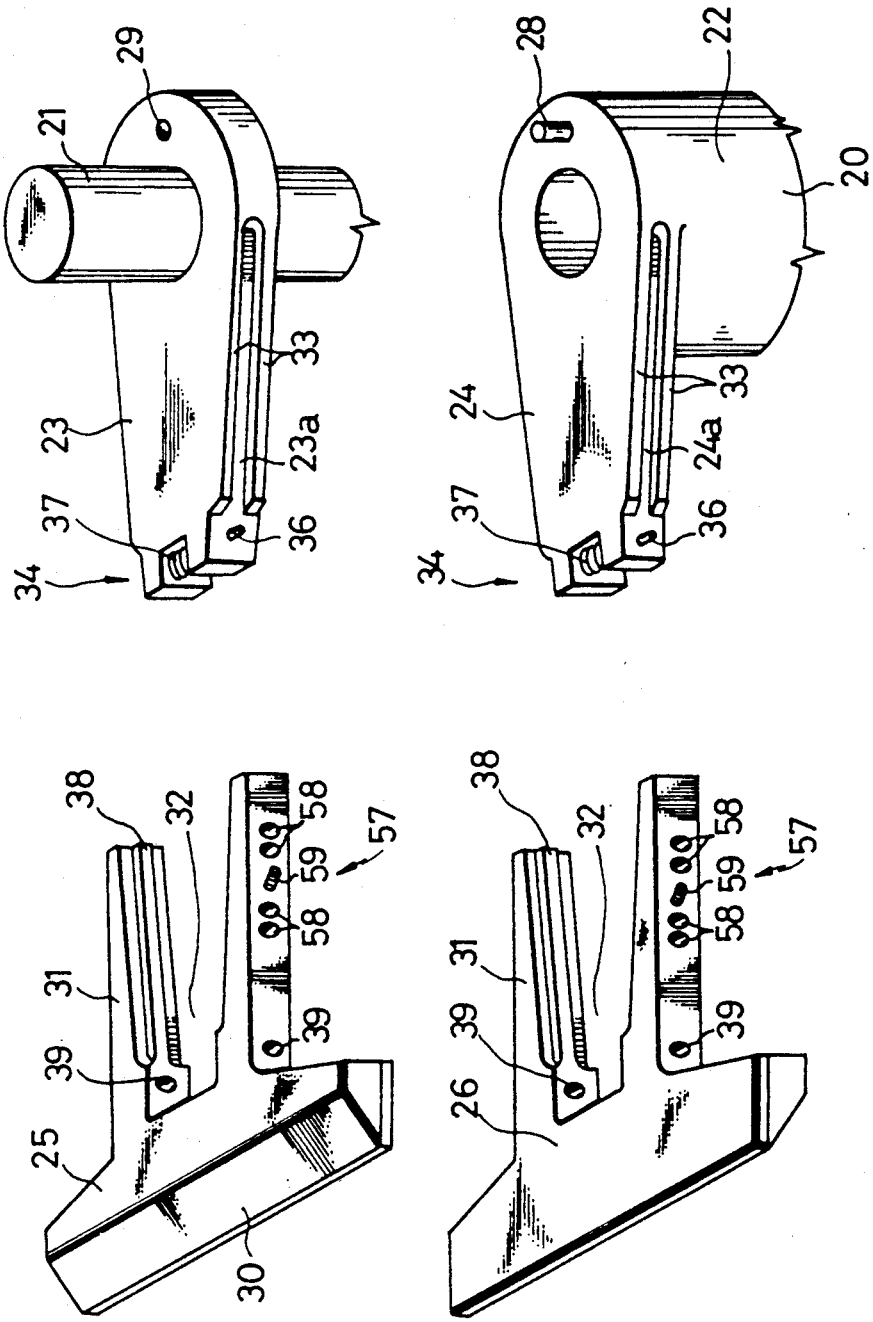
FIG. 3 is an exploded view of the plate clamping device of this embodiment of the present invention.

Specifically a rotating tube 20 shown in FIG. 3 is provided on the end of the arm 18 in a freely swinging and freely rotating manner centered around the axis A and axis B. As shown in FIG. 3, a linear actuator 22 equipped with a rod 21, such as a piston rod, which can freely advance and retreat along the shaft A is provided inside the rotating tube 20.

An upper bracket 23 and a lower bracket 24 are provided on the rod 21 and rotating tube 20. A hole 29 is provided in the upper bracket 23, and a pin 28 is provided on the lower bracket 24 to mutually prevent rotation. An upper jaw 25 and a lower jaw 26 for clamping the plate 2 are installed in a freely removable manner on the upper bracket 23 and the lower bracket 24 respectively.

As a result of this configuration, the upper jaw 25 and the lower jaw 26 are driven to freely approach and withdraw from one another, and to freely move along five axes (the axis A, the axis B, and three axes mutually at right angles to one another) with respect to the plate bending machine 1. Here, the action of the upper jaw 25 and the lower jaw 26 along the five axes are implemented by means of actuators such as stepping motors connected through the control lines 5a to the control device 5 which is activated based on a sensing signal from a sensing means such as an encoder (omitted from the drawings).

Accordingly, the plate 2 fed to the plate bending machine 1 can be maintained by the manipulator 11 during the course of the plate bending process.

An auxiliary clamping device 29 with the same configuration as the plate clamping device 19 is provided on the base plate 13.

Accordingly, the auxiliary clamping device 29 performs a clamping exchange of the plate 2 by means of the manipulator 11 for a plate bending machine, and bending is performed on the edge section which is clamped by the manipulator 11.

Next, the mechanism for mounting the jaws 25, 26 on the brackets 23, 24 will be explained in detail, with reference to FIG. 3 and FIG. 4 (The mechanism for installing the upper jaw on the upper bracket and the mechanism for installing the lower jaw on the lower bracket are identical, so the following explanation will cover only the installation of the upper jaw on the upper bracket).

For example, the upper jaw 25, which is formed in almost T-shape, comprises a plate clamping section 30, which is formed in a width suitable for clamping the plate 2, and a leg section 31 which extends in a direction at right angles to the longitudinal direction of the clamping section 30. More specifically, the leg section 31 comprises two legs provided on the plate clamping section 30 forming between them a V-shaped concave section 32 of a width which is sufficient to allow the leg section 31 to easily engage with the upper bracket 23 at the exit of the concave section 32.

The upper bracket 23 is formed in the shape of a wedge which becomes narrower toward the tip, corresponding to the shape of the concave section 32. On a side wall 23a of the upper bracket 23, a guide rib 33 is formed to guide the upper jaw 25 when it is being inserted into the upper bracket 23.

An engaging member 34 is provided on the end section of the upper bracket 23 to engage the upper jaw 25. More specifically, as shown in FIG. 4, a supporting section 35 is formed on the end section of the upper bracket 23. A pair of engaging pins 36 are provided on the supporting section 35 in a freely projectable and withdrawable manner with respect to a transverse outer side wall 23a of the upper bracket 23. An elastic member 37 such as a spring which energizes the engaging pins 36 in the projecting direction with respect to the outer side wall 23a is provided between the pair of engaging pins 36.

Again referring to FIG. 3, a guide rib 38 which can engage the guide rib 33 are formed on the inner side wall of the leg section 31 of the upper jaw 25. In addition, a laterally penetrating through-hole 39 is formed on the base edge section of the guide rib 38 as a receptacle section which can engage the pins 36 of the engaging member 34.

As a result of the above configuration, in the concave section 32 of the upper jaw 25, while the guide rib 33 is engaging the guide rib 38, the engaging pin 36 contacts the inner side wall of the leg section 31 of the upper jaw 25 and is pushed into the upper bracket 23. After having been pushed into the upper bracket 23, the engaging pin 36, from the action of the elastic means 37, fits into the laterally penetrating through-hole 39, and the upper jaw 25 engages the upper bracket 23.

Also, the upper jaw 25 can be removed from the upper bracket 24 by pushing the engaging pin 36 out of the laterally penetrating through-hole 39 into the upper bracket 23.

Again referring to FIG. 1 and FIG. 2, the robotic device 4 of the present invention is provided with a jaw magazine 40 for accommodating exchange jaws 25a, 26a to be exchanged for the installed jaws 25, 26 on the manipulator 11.

Specifically, a brace 41 is provided on the side surface of the plate storage magazine 3. On the brace 41 are provided a plurality pairs of vertical brackets 42, 43 of the same configuration as the brackets provided on the manipulator 11. The exchange jaws 25a, 26a are installed on the brackets 42, 43 in a freely mountable and removable manner through the engagement of an engaging pin 36 and a laterally penetrating through-hole 39 in the same manner as previously described.

Accordingly, the jaws 25a, 26a accommodated in the jaw magazine 40 are dismounted from the brace 41 and can be exchanged by being moved to the manipulator side.

Again referring to FIG. 1, the robotic device 4 is further provided with a jaw exchange device 44 for exchanging the jaws 25, 26 mounted on the manipulator for the jaws stored in the jaw storage magazine 40. The jaw exchange device 44 comprises a jaw release means 45 which can mount and dismount the jaws, and a transfer means 46 which can transfer the jaw release means 45 between the manipulator and the jaw magazine.

In the transfer means 46, an elevation section 47 is mounted in a freely elevatable manner on the supporting column 9 provided on the plate storage magazine 3. An arm 48 which is freely rotatable in a horizontal plane (in the direction of the arrows in FIG. 1) is supported on the elevation section 47. A guide member 49, which has a jaw release member 45 mounted on both ends, is supported on the arm 48 in a freely rotating manner on a perpendicular surface around a shaft C through a motor 50, which is mounted on the arm 48 for rotating the guide member 49. Here, a guide member 49 is energized in an angled direction with respect to the arm 48. Its center section is supported on the arm 48.

Accordingly, from the movement of the elevation section 47 and the arm 48, the guide member 49 and the jaw release means 45 mounted thereon are moved from an optional height position in the vicinity of the jaw storage magazine 40 to the vicinity of the plate clamping device 19 of the manipulator 11. In addition, the positions of the jaw release devices 45 on each end of the guide member 49 are reversed by means of a 180 deg turn of the guide member 49.

Figure 5:
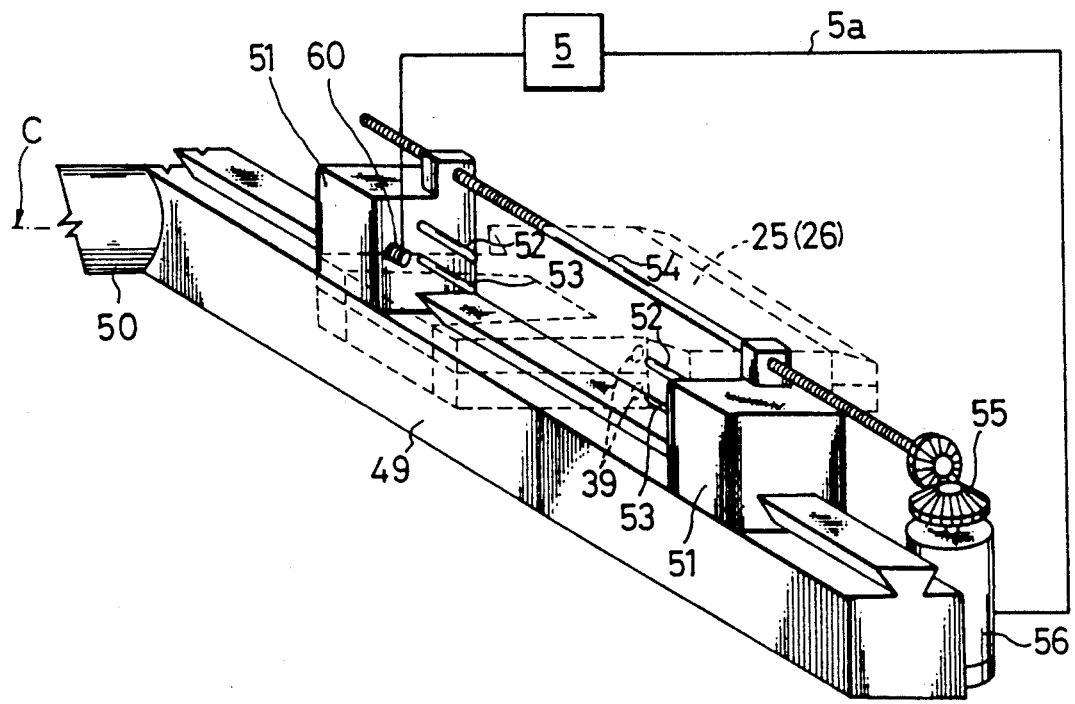
FIG. 5 is an enlarged oblique drawing of part of the jaw exchanging device of this embodiment of the present invention.

Now, as a more specific explanation of the jaw release means 45, as shown in FIG. 5, a pair of compression blocks 51 as compression members positioned in mutual opposition on the guide member 49 are installed to run along the guide member 49 in a freely reciprocal manner. On each of the opposing surfaces of the compression blocks 51, a pair of releasing rods 52, 53 are provided in a freely penetrating manner to the laterally penetrating through-hole 39 of the jaws 25, 26.

On the compression blocks 51 a reversing worm screw 54 engages the blocks 51 to move them in a freely approaching and receding manner. The reversing worm screw 54 is linked to an actuator 56, such as a stepping motor, through the medium of a bevel gear 55.

Figure 4:
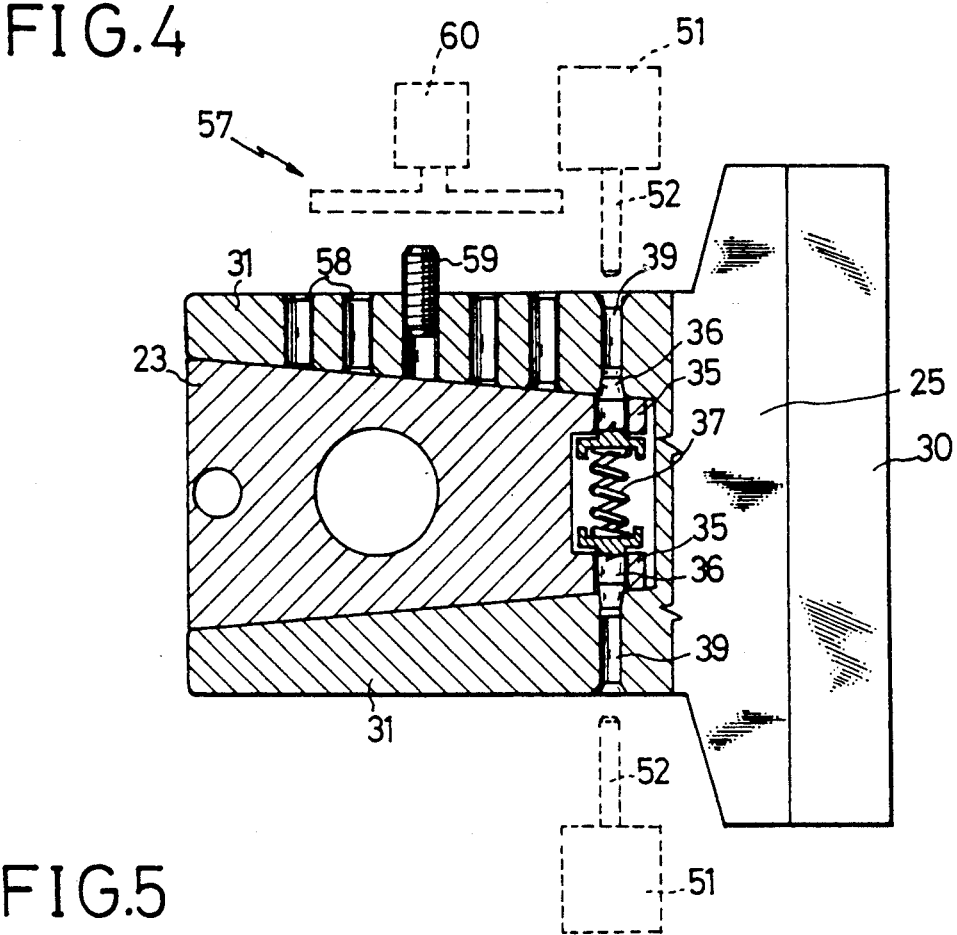
FIG. 4 is an enlarged sectional drawing of the part of FIG. 2 viewed in the direction of the arrow V.

In addition, when the arm 48 and the guide member 49, and are positioned as shown by the solid line in FIG. 1, for example, the engaging rods 53, 54 mounted on the compression blocks 51 as shown in FIG. 4 and FIG. 5, can be inserted into the respective laterally penetrating through-holes 39 of the jaws 25, 26 installed on the manipulator 11.

In addition, a control wire 5a from the control device 5 is connected to actuators for moving elevation section 47 and arm 48 (not shown), the motor 50 and the actuator 56.

By means of this configuration, the control of the control device 5 is carried out. For example, the jaws 25, 26 of the manipulator 11 are positioned in the prescribed spatial position shown in FIG. 1 and FIG. 2, and when caused to assume a mutually contacting state (the state in which the jaws are closed), the releasing rods 52, 53 in the jaw release means 45 are respectively inserted in the laterally penetrating through-holes 39 of the jaws 25, 26, the engaging pin 36 is pressed into the brackets 23, 24, and the jaws 25, 26 are removed from the brackets 23, 24.

Again referring to FIG. 3 and FIG. 4, in the robotic device 2 of the present invention, in order to automatically exchange the jaws, a jaw discriminating means 57 is provided for discriminating between the jaws when the jaws are being exchanged.

Specifically, a plurality of threaded holes 58 are formed on one or both of the side sections of the jaws 25, 26. A plurality of screws 59 corresponding to the number of jaws, is provided and these screws 59 are inserted into the threaded holes 58. In addition, in order to detect the location of the screws 59, a sensor 60 is provided on the compression blocks 51 of the jaw release means 45. In this configuration, a "0" or "1" signal is created, depending on whether or not the screws 59 are inserted into the threaded holes 58. Specifically, the type of the jaws 25a, 26a is determined by means of a 0/1 type of binary code. An optical sensor may be used as the sensor 60 but a magnetic proximity sensor is preferable.

Also, a signal analysis means for analyzing signal from the sensor 60 and determining the type of the jaws 25a, 26a is provided on the control device 5 (not shown).

Accordingly, the type of the jaws can be detected when the jaws are inserted between the compression blocks 51 of the jaw releasing means 45.

The total action of changing the jaws 25, 26 will now be explained from this configuration of the robotic device 4.

First, the plate 2 fed to the manipulator 11 from the plate feeding device 6 is clamped by the plate clamping device 19 of the manipulator 11, and, while being moved by the first transfer block 14, the second transfer block 16, the elevating section 10 and the like, the plate 2 is bent by the plate bending machine 1.

Then, for example, when the jaws 25, 26 are changed during the bending operation, the manipulator 11 is moved to the position indicated in FIG. 1 and FIG. 2, based on a program stored in the control device 5. At this time, the plate 2, for example, is clamped in the auxiliary plate clamping device 29. The arm 48 of the jaw exchange device 44 is rotated to the position indicated by the dotted line in FIG. 1 to withdraw the exchange jaws 25a, 26a stored in the jaw storage magazine 40. More specifically, as indicated in FIG. 5, the arm 48 is positioned with respect to the brace 41 of the jaw magazine 40 so as to insert the exchange jaws 25a, 26a between the compression blocks 51 of the guide member 49.

Here, as necessary, the exchange jaws 25a, 26a, which are approached by the jaw exchange device 44, are checked by the sensor 60 to determine whether or not they are the desired jaws.

If they are the wrong jaws, an alarm is output, and the jaw storage data, which is stored in the control device 5, about the inside of the jaw magazine 40 is retrieved.

When it is confirmed that the exchange jaws 25a, 26a are the desired jaws, the releasing rods 52, 53 are inserted into the laterally penetrating through-hole 39 of the exchange jaws 25a, 26a, by means of the actuator 56, and the exchange jaws 25a, 26a are released from engagement with the jaw magazine 40.

Next, the arm 48 is rotated in the clockwise direction in FIG. 1, and the elevation section 47 is elevated as required. The exchange jaws 25a, 26a removed from the jaw magazine 40 are moved to a position in front of the plate clamping device 19 (to be precise, a position between the plate clamping device 19 and the plate bending machine 1).

At this point the guide member 49 is rotated 180 deg after which the arm 48 is subjected to a suitably small rotating action in the counterclockwise direction, and the jaws 25, 26 of the manipulator 11 are inserted into the empty jaw release means 45.

Next, by means of the action of the actuator 56, the releasing rod 52, 53 are inserted into the laterally penetrating through-hole 39 of the jaws 25, 26, and the engaging pin 36 of the brackets 23, 2.4 is withdrawn from the laterally penetrating through-hole 39 so that the jaws 25, 26 are released from the manipulator 11.

Next, the manipulator 11 or the jaw exchange device 44, or both these devices, are moved slightly in mutually opposite directions and the jaws 25, 26 are removed from the manipulator 11.

The guide member 49 is once again rotated 180 deg, and the exchange jaws 25a, 26a are positioned in the vicinity of the plate clamping device 19 of the manipulator 11, after which the manipulator 11 and the jaw exchange device 44 are moved in the direction of mutual contact, and the exchange jaws 25a, 26a are engaged by the brackets 23, 24 of the manipulator 11. At this time, as previously outlined, the engaging pins 36 of the brackets 23, 24 contact the inner side walls of the concave section 32 of the exchange jaws 25a, 26a. After being inserted from the outer side walls of the brackets 23, 24 to the inside, the pin 36, in a state where the brackets 23, 24 completely engage the jaw concave section 32, contact the tip of the head of the releasing rod 52 which is inserted into the laterally penetrating through-hole 39.

Accordingly, when the releasing rod 52 is extracted from the laterally penetrating through-hole 39, the engaging pin 36 is inserted into the laterally penetrating through-hole 39, and the exchange jaws 25a, 26a engage the brackets 23, 24 of the manipulator 11.

When the exchange is completed, the manipulator 11 returns to the operation interrupt position, and the jaw exchange device 44 returns to the direction of the jaw magazine 40. The jaws 25, 26 removed from the manipulator 11 engage with the appropriate brackets 42, 43 of the jaw magazine and are stored.

By means of the manipulator for a plate bending machine of the present invention, an engaging section is provided on the jaws for clamping a plate, and on the bracket provided on the arm, an engaging member, which can be freely engaged with and released from the engaging section, is provided so that an automatic exchange of jaws is easily accomplished.

In addition, by means of the robotic device for a plate bending machine of the present invention, a plurality of jaw release means are provided and this plurality of jaw release means can be moved together between the manipulator and jaw magazine; and from a position in the vicinity of the manipulator, any one of the plurality of jaw release means can be selectively moved to the jaw changing position on the manipulator, so that the exchange of the jaws can be quickly carried out.

Although a preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A manipulator for a plate bending machine comprising:
   an arm which extends substantially in the vertical direction;
   a pair of bracket members mounted on the arm in a manner such that one bracket member can freely approach and withdraw from the other;
   a pair of jaws for grasping a plate material; and
   means for removably mounting one of said jaws on each of said bracket members, the removable mounting means including a pair of engaging members provided on each of the bracket members, and a pair of engaging sections formed in each of the jaws, each engaging member cooperating with one of the engaging sections, each of the engaging members further including an engaging pin supported on one of the bracket members in a freely protruding and retracting manner in a sidewall thereof and means for biasing the engaging pin so as to protrude from the sidewall of the bracket member, and each of the engaging sections including an engaging hole for receiving one of the engaging pins protruded from one of the sidewalls of the bracket members wherein each jaw is provided with a pair of forked legs having a concave section therebetween to form left and right hand leg sections each having inside and outside walls, wherein the bracket member can be inserted in the concave section.

2. The manipulator of claim 1, wherein each of the engaging sections for receiving one of the engaging pins is formed at least in the inside wall of the jaws which abuts the sidewall of the bracket member when the jaw is mounted on the bracket member and includes an engaging through hole which communicates with the outside wall of each of the jaws.

3. The manipulator for a plate bending machine of claim 2 wherein the engaging through holes are formed in the left and right hand leg sections of the jaws and the engaging pin is provided from the corresponding left and right sidewalls of the bracket members in a freely protruding and retracting manner.

4. The manipulator for a plate bending machine of claim 3 wherein the bracket members are wedged shaped with the width narrowing toward the tip of the bracket.

5. The manipulator of claim 1, further comprising a plurality of first guide members each provided on one of the bracket members, and a plurality of second guide members each provided on one of the jaws, each of the first guide members cooperating with one of the second guide members so as to facilitate engagement of each of the engaging members with one of the engaging sections.

6. A jaw changing device for a manipulator, the manipulator having an arm which extends substantially in the vertical direction, a pair of bracket members mounted on the arm in a manner such that one bracket member can freely approach and withdraw from the other, a pair of jaws for grasping a plate material, and means for removably mounting each of the jaws on each of the bracket members, the removably mounting means including a pair of engaging members provided on each of the bracket members and a pair of engaging sections formed in each of the jaws, each engaging member cooperating with one of the engaging sections, the jaw changing device comprising:

means for disengaging at least one of the engaging members from one of the engaging sections in order to remove at least one of the jaws from one of the bracket members; and means for transferring the disengaging means between the manipulator and a jaw storage magazine.

7. The jaw changing device of claim 6, further comprising:

a guide means having opposed end sections which guide means is supported in a freely rotating manner at the center thereof on the transferring means wherein a pair of jaw release means is provided, one on each end section of the guide means.

8. The jaw changing device of claim 7, further comprising a detection means for detecting whether or not the exchange jaw is the desired jaw, when the exchange of the jaws take place.

9. The jaw changing device of claim 6, wherein each of said bracket members include a side wall, the engaging members of said removably mounting means each includes an engaging pin, said respective engaging pins being biased by a biasing means, and wherein the jaw disengaging means comprises a jaw releasing rod for pushing the engaging pin into the sidewall of the bracket against the biasing action of the biasing means.

10. A manipulator for a plate bending machine comprising:

an arm;

a pair of bracket members mounted on the arm in a manner such that one bracket member can freely approach and withdraw from the other;

a pair of jaws for grasping a plate material, each jaw being provided with a pair of forked legs having a concave section therebetween to form left and right hand leg sections each having inside and outside walls, wherein the bracket member can be inserted in the concave section; and means for removably mounting each of the jaws on one of said bracket members, the removable mounting means including a pair of engaging members provided on each of the bracket members, and a pair of engaging sections formed in each of the jaws, each engaging member cooperating with one of the engaging sections, each of the engaging members further including an engaging pin supported on one of the bracket members in a freely protruding and retracting manner in a sidewall thereof and means for biasing the engaging pin so as to protrude from the sidewall of the bracket member, and each of the engaging sections including an engaging hole for receiving one of the engaging pins protruded from one of the sidewalls of the bracket members.

* * * * *